United States Patent

Eckgold

(10) Patent No.: US 6,637,088 B2
(45) Date of Patent: Oct. 28, 2003

(54) CALIBRATING TOOL FOR MANUFACTURING PARTS WITH AN OUTER PROFILE

(76) Inventor: Roland Eckgold, Wiesenweg 1 42553, Velbert (DE)

(*) Notice: Subject to any disclaimer, the term of this patent is extended or adjusted under 35 U.S.C. 154(b) by 0 days.

(21) Appl. No.: 10/217,559

(22) Filed: Aug. 12, 2002

(65) Prior Publication Data

US 2002/0189064 A1 Dec. 19, 2002

Related U.S. Application Data

(62) Division of application No. 09/402,432, filed as application No. PCT/EP98/01887 on Apr. 1, 1998, now Pat. No. 6,430,791.

(30) Foreign Application Priority Data

| Apr. 9, 1997 | (DE) | 297 06 273 |
| Apr. 9, 1997 | (DE) | 297 06 274 |
| Apr. 9, 1997 | (DE) | 297 06 272 |

(51) Int. Cl.$^7$ .............. B23P 15/14; B23D 37/12
(52) U.S. Cl. .............. 29/56.5; 409/60; 409/253; 72/275; 407/14
(58) Field of Search .............. 409/249, 59, 60, 409/58, 253, 252, 269, 275, 276, 277; 29/56.5; 407/12–19; 72/275

(56) References Cited

U.S. PATENT DOCUMENTS

| 1,901,500 A | 3/1933 | Ferris |
| 2,065,219 A | 12/1936 | Ferris |
| 2,225,731 A | 12/1940 | Averill |
| 2,237,959 A | 4/1941 | Hansen et al. |
| 2,304,185 A | 12/1942 | Lee |
| 2,338,603 A | 1/1944 | Schultz |
| 2,461,320 A | 2/1949 | Green |
| 2,473,815 A | 6/1949 | Oakley |
| 2,511,298 A | 6/1950 | Schinnerer |
| 2,547,509 A * | 4/1951 | Tozer .............. 409/276 |
| 2,674,780 A | 4/1954 | Nielsen |
| 2,674,924 A | 4/1954 | Nielsen |
| RE24,284 E | 3/1957 | Kopec |
| 3,293,988 A | 12/1966 | Strempel |

FOREIGN PATENT DOCUMENTS

| DE | 896904 | 7/1949 |
| DE | 8915215.8 | 12/1989 |
| DE | 9407708.8 | 5/1994 |

* cited by examiner

Primary Examiner—A. L. Wellington
Assistant Examiner—Erica E Cadugan
(74) Attorney, Agent, or Firm—Mallinckrodt & Mallinckrodt; Robert R. Mallinckrodt

(57) ABSTRACT

In order to manufacture parts with an outer profile, a workpiece 32 is pressed by a pressure piece 24 through a ring-shaped cutting tool 34. The cutting tool 34 has a plurality of disks with inner cutting edges 62 for removing material from the workpiece 32. The cutting edges are progressively longer in the advance direction, so that each cutting edge removes material chips and the last cutting edge in the advance direction corresponds to the desired outer profile of the part. In order to improve chip removal, the chip chambers 74 located between the cutting edges communicate with the outside through radial connection openings 128 which are distributed all around their circumference. To hold the workpiece 32 securely on the pressure piece 24, a pressure pad 76 extends through the cutting tool 34 and is supported on the side of the workpiece 32 opposite to the pressure piece 32, and a hydraulic piston 80 generates a compression force on the pressure pad 76. To ensure a high dimensional accuracy, a calibrating tool with a passage whose dimensions at the rear outlet side correspond to the set dimensions of the part to be manufactured is arranged behind the cutting tool.

20 Claims, 5 Drawing Sheets

CALIBRATING TOOL FOR MANUFACTURING PARTS WITH AN OUTER PROFILE

RELATED APPLICATION

This is a divisional of copending application Ser. No. 09/402,432, filed Oct. 7, 1999, now U.S. Pat. No. 6,430,791 and entitled "Device for Manufacturing Parts with an Outer Profile" which is a 371 of PCT/EP98/01887 filed Apr. 1, 1998, U.S. Pat. No. 6,403,791.

BACKGROUND OF THE INVENTION

1. Field

The invention relates to a device for manufacturing parts which are provided with an outer profile wherein a work piece is pressed by a thrust piece in an advance direction through an annular cutting tool, the cutting tool has a plurality of cutting edges for removing material from the work piece, the cutting edges are progressively projecting in advance direction, each cutting edge removing material chips and the last cutting edge in advance direction corresponding to the desired outer profile of the part.

2. State of the Art

Such devices are for example known from U.S. Pat. Nos. 2,674,924, 2,547,509, 2,461,320, or DE-OS-2 259 030.

In these above mentioned devices of the prior art the cutting tool forms a closed pipe. Chip chambers for receiving the chips are formed between the cutting edges of this pipe. It makes difficulties to remove the chips out of the pipe. Thereby, the working cycle is prolonged in an undesirable way.

From DE-U-94 07 708.8 a device of the first-mentioned type is known in which the cutting tool has a plurality of annular discs which form the cutting edges and are spaced by spacers. Each of the spacers is formed by two rectangular plates laterally spaced, which form, therebetween, a channel communicating with the outside. Chips can be removed through this channel.

In this known arrangement the chips can be removed between each pair of the cutting edges only in two opposite radial directions. It has been found that also herein the chip removal makes difficulties.

SUMMARY OF THE INVENTION

It is the object of the invention to improve the chip removal in a device of the type mentioned in the beginning.

It is a further object of the invention to ensure, in a device of the type mentioned in the beginning, the secure holding of the work piece on the thrust piece. Particularly it should be possible to hold also small work pieces securely on the thrust piece and to machine them with a device of the type mentioned in the beginning.

Finally, it is an object of the invention, to manufacture parts of high dimensional accuracy and with high surface quality by means of a device of the type mentioned in the beginning.

An improvement of the chip removal is achieved by means of the device of the type mentioned in the beginning in forming chip chambers for receiving the chips between the cutting edges, which chip chambers are communicating with the outside through radial connecting openings distributed all around the circumference.

The chips are usually produced all around the circumference of the part. Due to the formation and arrangement of the connected openings according to the invention, the chips can hence be distributed and radially removed all around the circumference where they are produced.

A secure holding of the work piece on the thrust piece of a device of the above mentioned type is ensured by a pressure pad extending through the cutting tool and supported on the side of the work piece opposite to the thrust piece, and by means for generating force onto the pressure pad.

The working piece is then clamped between the thrust piece and the pressure pad. The force acting on the thrust piece and therethrough onto the work piece overcomes the force of the pressure pad. Thereby the pressure pad is pressed back by the cutting tool when the work piece is moving. By this clamping, also very small work pieces can be held securely and in defined location at the thrust piece.

To ensure a high dimensional accuracy with the device of the firstly mentioned type, a calibrating tool having a passage is arranged behind the cutting tool as viewed in advance direction, the dimensions of which tool at the rear outlet side correspond to the nominal dimensions of the part to be manufactured.

After the removing process performed by the cutting tool, thus a cold deformation takes place without separation of chips. Hereby the material is distributed and the surface polished. Thus parts with high dimensional accuracy and high surface quality can be produced.

The before mentioned characteristics of the invention are applied preferably in combination. They can be used also individually or in subcombinations.

Further modifications of the invention are subject matter of the subclaims.

An embodiment of the invention is further explained below referring to the accompanying drawings.

THE DRAWINGS

DETAILED DESCRIPTION OF THE ILLUSTRATED EMBODIMENTS

Figure 1:
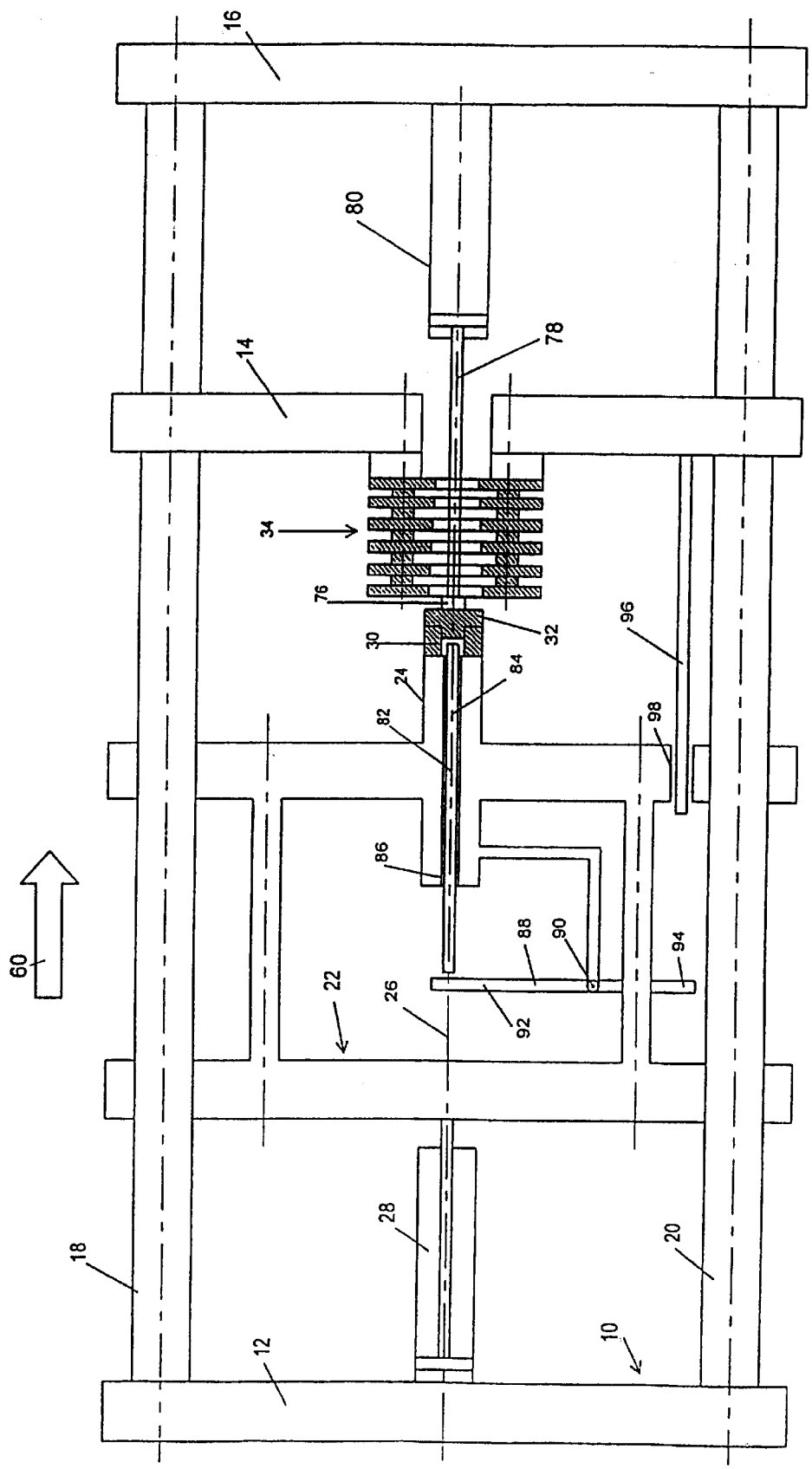
FIG. 1 is a schematic illustration of a device for manufacturing parts provided with an outer profile for example of gear wheels.

In FIG. 1, numeral 10 designates a frame of the machine having three traverses 12, 14, 16 and two parallel guiding columns 18 and 20. A sliding carriage 22 is guided on the guiding columns 18 and 20. A thrust piece 24 is located on the sliding carriage 22. The thrust piece 24 is coaxial to an axis 26 extending in the center of the machine frame 10 parallel to the guiding columns 18 and 20. A hydraulic jack 28 also aligned with the axis 26 is supported by the traverse 12 and engages the sliding carriage 22. The hydraulic cylinder 28 can move the sliding carriage 22 along the guiding columns 18 and 20. Herewith, the hydraulic cylinder 28 can apply a high pressure force to the right in the FIG. 1 onto the sliding carriage 22. The sliding carriage 22 can also be driven back to the left in FIG. 1 by the hydraulic cylinder 28.

A mounting 30 is located on the thrust piece 24. The mounting 30 holds a work piece 32.

Figure 3:
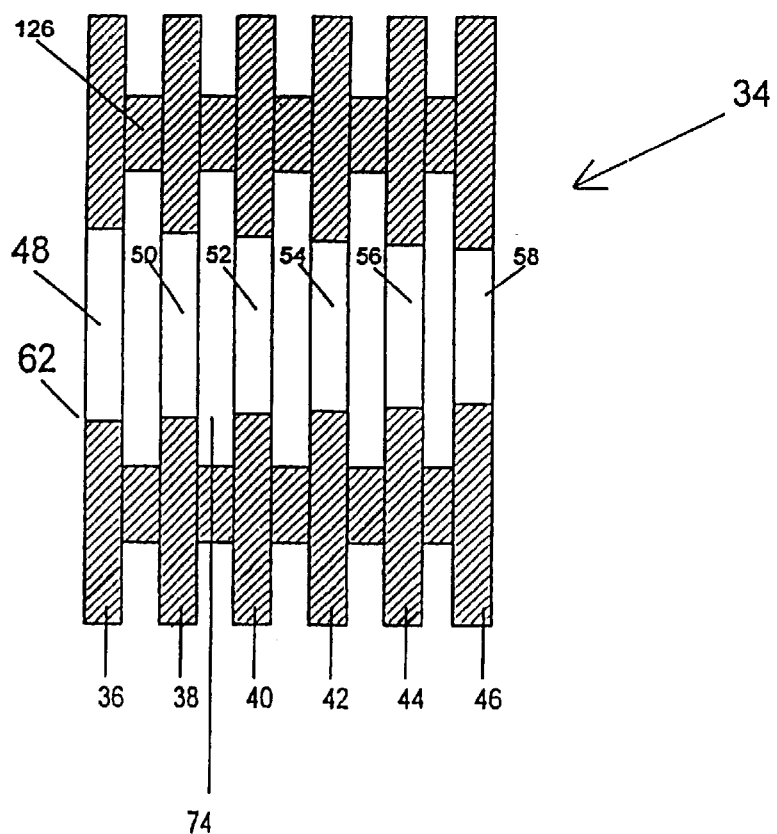
FIG. 3 shows a longitudinal view through a cutting tool of FIG. 2.

A cutting tool 34 is fixed at the traverse 14. The cutting tool 34 is also coaxial to the axis 26. The cutting tool 34 is best seen in FIG. 1 and FIG. 3. The cutting tool 34 comprises a plurality of annular discs 36, 38, 40, 42, 44 and 46. The annular discs 36, 38, 40, 42, 44 and 46 have profiled apertures 48, 50, 52, 54, 56, and 58, respectively. The apertures 48, 50, 52, 54, 56 and 58 are gradually narrower. The first aperture 48 in advance direction 60 is the widest, the last aperture in advance direction is the narrowest. The apertures 48 to 58 are increasingly approaching a desired profile of the manufactured part, for example a gear wheel. The apertures form cutting edges 62. Chips are removed form the work piece 32 by means of these cutting edges 62. A slightly wavy contour of circumference results therewith for example after the passage through the annular discs 36, which contour of circumference becomes deeper and deeper after the passage through the discs 38, 40, 42 and 44, until finally after passage through the last annular disc 46 the desired gear wheel profile is obtained. In the same way, also parts of nearly all other contours can be obtained.

The annular discs 36, 38, 40, 42, 44 and 46 are spaced by spacers. Thereby chip chambers 74 are formed between the annular discs. The spacers are formed such that the chip chambers 74 are connected to the outside between the spacers, as will be explained further below.

As may be seen from FIG. 1, the work piece 32 is fixed at the mounting 30 by a pressure pad 76. The pressure pad 76 is located at the end of piston rod 78 of a fluid operated preferably pneumatic jack 80, the pressure pad 76 and the jack 80 are also aligned with the axis 26. The pressure pad 76 is driven through the cutting tool 34 against the advance direction 60 by the jack 80 and is engaging the work piece 32. When then the sliding carriage 22 is moved in advance direction to the right in FIG. 1 by the hydraulic jack 28, the force of the hydraulic jack 28 exceeds that of the jack 80. The pressure pad 76 is then together with the thrust piece 24 and the work piece 32 moved back to the right against the force of the jack 80. The pressure pad 76 remains with constant force engaged to the work piece.

With this movement the work piece 32 will be machined in the above described way by the cutting tool. The pressure pad 76 ensures that the work piece 32 is held in a fixed position to the mounting 30 and therewith to the cutting tool 34. This is also true when relatively small work pieces are to be machined.

When the completely machined work piece 32 emerges at the right end in FIG. 1, the pressure pad 76 is moved backwards and the work piece 32 is pressed out of the mounting 30 by an ejector 82. The ejector 82 comprises a bar 84. The bar 84 extends through a central longitudinal bore 86 of the thrust piece 24 and the mounting 30. The bar 84 projects out of the bore 86 on the side remote from the work piece 32. A two-armed lever 88 is pivotally mounted about a pivot point 90 on the sliding carriage 22 or the thrust piece 24. The lever 88 has longer lever arm 92 engaging the bar 84 and a shorter lever arm 94 extending downwards in FIG. 1. A bar 96 is fixed at the traverse 14. The bar 96 extends parallel to the guiding columns 18 and 20 and through a passage 98 of the sliding carriage 22. The bar 96 projects in to the track of the shorter lever arm 94 of the lever 88. When the sliding carriage 22 with the work piece 32 reaches the position of ejection where the work piece 32 should be ejected, the lever arm 94 engages the bar 96. Thereby the two-armed lever 88 pivots clockwise in FIG. 1 and, with its longer lever arm 92, pushes the bar 84 to the right in FIG. 1. Thereby the machined work piece 32 is ejected.

Figure 2:
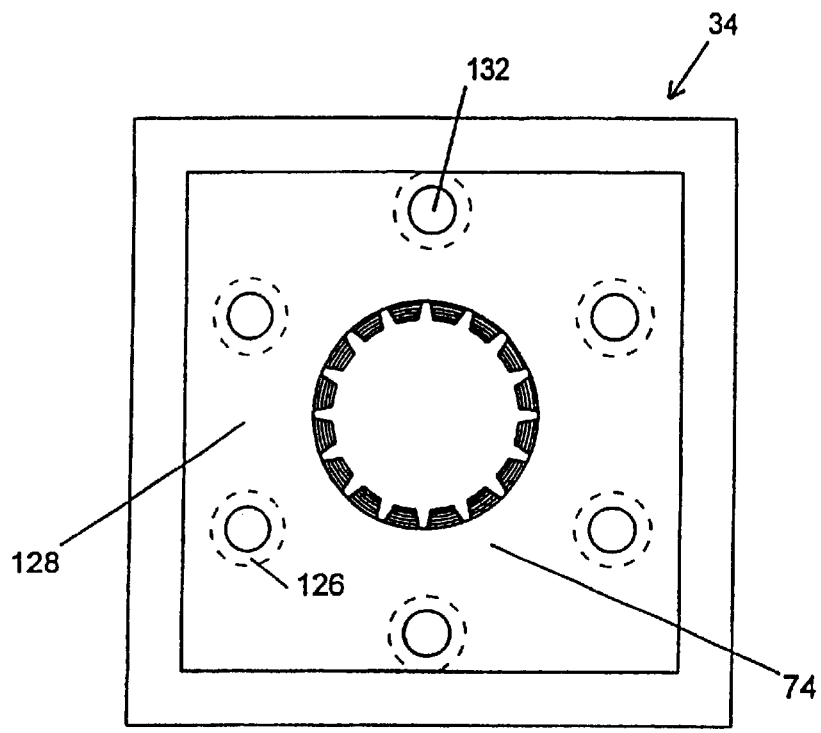
FIG. 2 is an axial view of a cutting tool of a device of FIG. 1.

From FIG. 2 the formation and the arrangement of the spacers between the individual annular discs 36, 38, 40, 42, 44 and 46 of the cutting tool 34 can be seen. The spacers are annular spacing discs 126 regularly arranged in a circular array around the axis 26. In the illustrated embodiment six of such spacing discs are provided. The connecting opening 128 are formed between these spacing discs 126, which openings are connecting the chip chambers 74 formed between the annular discs 36, 38, 40, 42, 44, 46 and the cutting tool 34 to the outside. Bolts 132 are guided through the annular discs 36, 38, 40, 42, 44, 46 and the spacing discs 126 and hold the cutting tool 34. The spacing discs 126 occupy a substantially smaller angular range around the axis of the cutting tool 34 than the connecting openings 128. Thereby, the chip chambers 74 are practically open to all sides.

Figure 4:
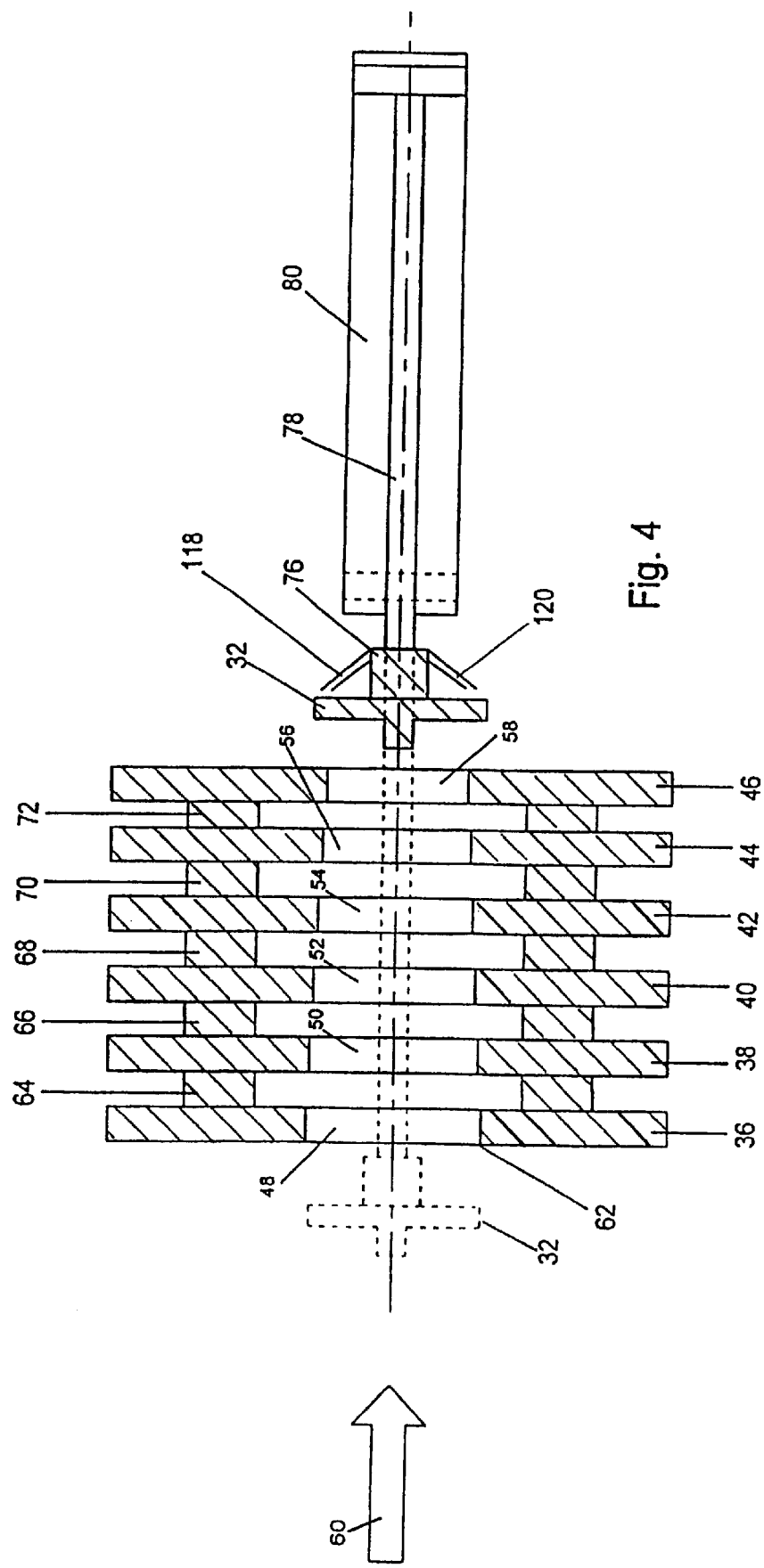
FIG. 4 is a schematic illustration with a hydraulic circuit diagram and shows the generation of the contact force of the pressure pad.

As can be seen from FIG. 4, passages for a rinsing fluid, for example compressed air, are guided in the piston rod 78. The passages end in nozzles 118, 120 located on the pressure pad 76 and directed towards the outer edges of the work piece 32. The chips are removed at these edges by the cutting tool 34. These chips are blown out by the rinsing fluid (compressed air) and directly transported outwards out of the respective chip chamber 74 between the spacers 126 of this chip chamber.

It is also possible that the pressure pad 76 has lubricant passages through which in a similar way a lubricant is guided onto the work piece 32.

Figure 5:
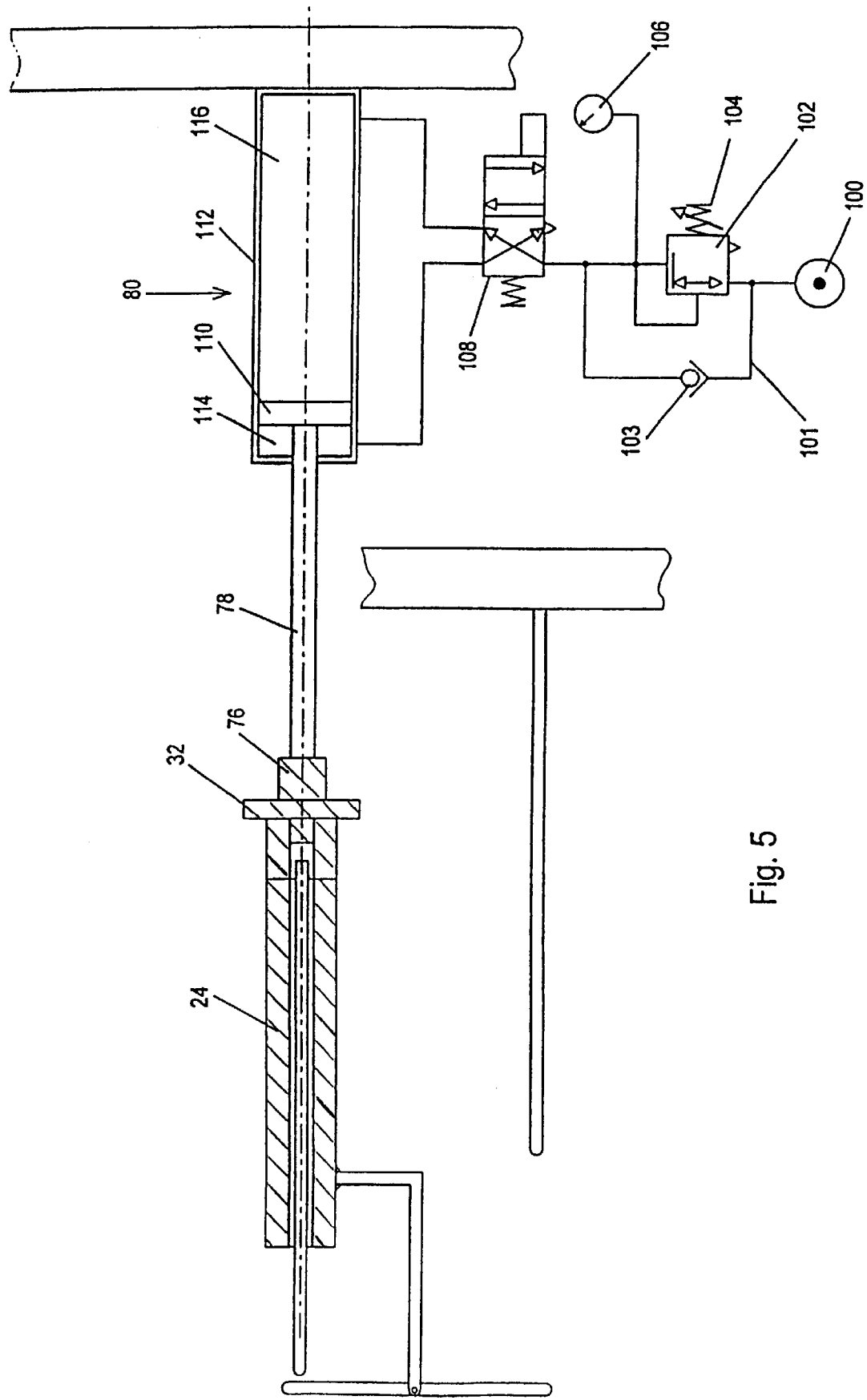
FIG. 5 shows in particular the pressure pad having passages for supplying the rinsing fluid for removing the chips.

FIG. 5 shows the generation of the constant compressed force at the pressure pad 76.

Numeral 100 designates a fluid source for example a common compressed air pipe, supplying a fluid under pressure. The fluid is applied through a pipe 101 having a check valve 103 and a change-over valve 108 to the jack 80. The jack 80 has a piston 110 to which pressure can be applied from two sides and which is dividing the cylinder 112 into a first cylinder chamber 114 on the side of the piston rod 78 and a second cylinder chamber 116 on the remote side of the piston rod 78. In the illustrated position of the change-over valve 108, the fluid source is connected to the second cylinder chamber 116. The first cylinder chamber 114 is connected to the atmosphere. The piston 110 and therewith the pressure pad 76 is then moved to the left in FIG. 5 until the pressure pad 76 engages the work piece 32 with a contact force defined by the pressure of the fluid source. When the work piece 32 is pressed towards the right in FIG. 5 by the thrust piece 24 the fluid in the second cylinder chamber 116 is compressed. The check valve 103 closes. The pressure of the fluid is now regulated to an adjustable value by a pressure regulator 102 through which the fluid flows out. The pressure adjustment is symbolized by the spring 104. The adjusted pressure or the contact force proportional thereto can be read at a manometer 106. While pressing the work piece 32 through the tool 34 a constant counter pressure is maintained on the pressure pad 76. When the work piece 32 is pressed through the cutting tool 34 the change-over valve 108 is actuated by a contact (not shown). After the actuation of the change-over valve 108 the first cylinder chamber 114 is connected to the outlet of the pressure regulator 102. The second cylinder chamber 116 is connected to atmosphere. Thereby the pressure pad 76 is driven backwards in FIG. 5. Thereby the ejector 82 can eject the work piece 32.

Figure 6:
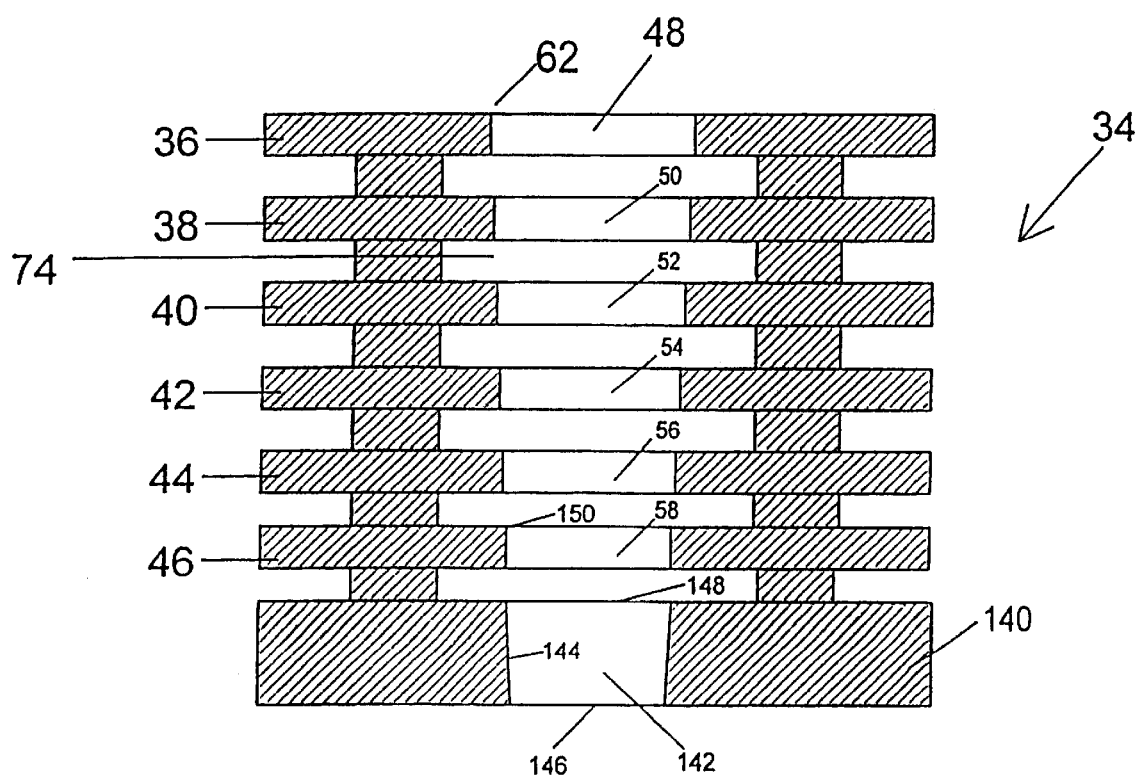
FIG. 6 shows a longitudinal view through a cutting tool which is provided with a calibrating tool connected downstream.

In the embodiment of FIG. 6, a calibrating tool 140 is arranged in alignment with and behind the cutting tool 34 as viewed in advance direction. The calibrating tool 140 has a passage 142. The inner wall 144 of the calibrating tool 140 is slightly conical in advance direction, such that the outlet diameter 146 of the calibrating tool 140 is slightly—about fractions of a millimeter or a hundreth part of a millimeter—smaller than the inlet diameter 148. The inner wall 144 shows a high surface quality.

The dimensions of the inlet diameter 148 of the passage 142 of the calibrating tool 140 on the front side in advance direction correspond to those on the outlet side at the rear cutting edge 150 of the cutting tool 34 as viewed in advance direction. The dimensions of the outlet diameter of the passage 142 on the rear outlet side correspond to the set dimensions of the part to be manufactured.

The calibrating tool 140 is significantly harder than the cutting edges for example 150 of the cutting tool 34.

Due to the described calibration tool 140 a slight cold deformation of the work piece takes place. Thereby a high dimensional accuracy of the manufactured part is ensured. Due to the deformation, the material is distributed and smoothed on the surface. A high surface quality of the part results.

I claim:

1. Device for manufacturing parts provided with an outer profile wherein
   a work piece (32) is pressed by a thrust piece (24) in an advance direction (60) through an annular cutting tool (34),
   the cutting tool has a plurality of annular discs (36, 38, 40, 42, 44, and 46) with inner cutting edges (62) surrounding cutting tool openings (48, 50, 52, 54, 56, and 58), said inner cutting edges being for removing material from the work piece (32),
   the annular discs (36, 38, 40, 42, 44, 46) are spaced by spacers and connected by bolts,
   and the cutting edges (62) are progressively projecting in the advance direction,
   each cutting edge (62) removing material chips and the last cutting edge in the advance direction (60) corresponding to the desired outer profile of the part,
   chip chambers (74) being formed between the cutting edges (62) for receiving the chips, and being connected to outside the device through radial connecting openings,
   characterized in that a calibrating tool (140) for performing a cold deformation and having a passage slightly tapering along the advance direction (60) and with a rear outlet side is provided behind the cutting tool (34) as viewed in the advance direction (60), and in which the dimensions of the rear outlet side correspond to the set dimensions of the part to be manufactured.

2. Device as set forth in claim 1, characterized in that the dimensions of the passage (142) of the calibrating tool (34) at the front side as viewed in the advance direction correspond to the cutting edge (150) of the cutting tool (34) on the rear and outlet side of the cutting tool as viewed in the advance direction.

3. Device as set forth in claim 1, characterized in that the calibrating tool (140) is harder than the cutting edges (62, 150) of the cutting tool (34).

4. Device as set forth in claim 1, characterized in that the dimensions of the passage (142) of the calibrating tool (140) at a front side of the calibrating tool (140) as viewed in the advance direction correspond to dimensions of an adjacent one of the cutting edges (150) of the cutting tool (34) at a rear side thereof as viewed in the advance direction.

5. Device as set forth in claim 4, wherein the work piece is pressed into the calibrating tool, and characterized in that the calibrating tool (140) is harder than the cutting edges (62, 150) of the cutting tool (34) to the extent that a cold deformation of the work piece takes place as the work piece is pressed into the calibrating tool.

6. Device as set forth in claim 1, characterized in that the work piece (32) is pressed by a contact force against the thrust piece (24) by means of a pressure pad (76) which is carried into the cutting tool (34) against the advance direction (60), that rinsing fluid passages exit at the interior of said discs to thereby guide a rinsing fluid onto the work piece (32) such that material chips are forced through the connecting openings (128) to outside the device directly after their formation, and the pressure pad (76) includes the rinsing fluid passages through which the rinsing fluid is guided onto the work piece (32) such that the chips are removed outside through the connecting openings (128) directly after their formation.

7. Device as set forth in claim 6 characterized in that the contact force is generated by a jack (80) driven by fluid.

8. Device as set forth in claim 7, characterized in that the contact force generated by the jack (80) is defined by drive fluid pressure and the drive fluid pressure is regulated by a pressure regulator (102).

9. Device as set forth in claim 8, characterized in that jack (80) comprises a double-acting piston (110) reversible by a change-over valve (108).

10. Device as set forth in claim 9, characterized in that the thrust piece (24) is mounted on a sliding carriage (22) guided on guiding columns (18, 20), which carriage is arranged to be displaced by a hydraulic jack (28) in the advance direction (60).

11. Device as set forth in claim 10, characterized in that an ejector (82) for ejecting the work piece (32) is guided in the thrust piece (24), which ejector is arranged to be operated by a machine-fixed stop (36) via a linkage of bars (84, 88) when reaching a final position after the work piece (32) has been pressed through the cutting tool (34).

12. Device as set forth in claim 6, characterized in that the thrust piece (24) is mounted on a sliding carriage (22) guided on guiding columns (18, 20), which carriage is arranged to be displaced by a hydraulic jack (28) in the advance direction (60).

13. Device as set forth in claim 12, characterized in that an ejector (82) for ejecting the work piece (32) is guided in the thrust piece (24), which ejector is arranged to be operated by a machine-fixed stop (36) via a linkage of bars (84, 88) when reaching a final position after the work piece (32) has been pressed through the cutting tool (34).

14. Device as set forth in claim 1, characterized in that the work piece (32) is pressed by a contact force against the thrust piece (24) by means of a pressure pad (76) which is carried into the cutting tool (34) against the advance direction (60), and the pressure pad (76) has lubricant passages through which a lubricant is guided onto the work piece (32).

15. Device as set forth in claim 1, characterized in that the thrust piece (24) is mounted on a sliding carriage (22) guided on guiding columns (18, 20), which carriage is arranged to be displaced by a hydraulic jack (28) in the advance direction (60).

16. Device as set forth in claim 15, characterized in that an ejector (82) for ejecting the work piece (32) is guided in the thrust piece (24), which ejector is arranged to be operated by a machine-fixed stop (36) via a linkage of bars (84, 88) when reaching a final position after the work piece (32) has been pressed through the cutting tool (34).

17. Device as set forth in claim 1, characterized in that a contact force between the work piece and the thrust piece is generated by a jack (80) driven by fluid.

18. Device as set forth in claim 17, characterized in that the contact force generated by the jack (80) is regulated by a pressure regulator (102).

19. Device as set forth in claim 18, characterized in that the jack (80) comprises a double-acting piston (110) reversible by a change-over valve (108).

20. Device as set forth in claim 19, characterized in that the thrust piece (24) is mounted on a sliding carriage (22) guided on guiding columns (18, 20), which carriage is arranged to be displaced by a hydraulic jack (28) in the advance direction (60).

* * * * *